United States Patent [19]
de Moncuit et al.

[11] Patent Number: 5,154,953
[45] Date of Patent: Oct. 13, 1992

[54] COMPOSITE GLAZING PANEL

[75] Inventors: Frédéric de Moncuit, Paris, France; Georges De Clerck, Chatelet; Vincent Lieffrig, Namur, both of Belgium

[73] Assignee: Glaverbel, Brussels, Belgium

[21] Appl. No.: 464,861

[22] Filed: Jan. 16, 1990

[51] Int. Cl.$^5$ .......................... E06B 3/24; B32B 17/10; B60J 1/02

[52] U.S. Cl. ..................... 428/34; 428/212; 428/213; 428/217; 428/120; 428/415; 428/417; 428/418; 428/430; 428/432; 428/437; 428/458; 428/702; 52/788; 52/790; 296/96.14; 181/286; 181/289

[58] Field of Search ................ 428/34, 415, 414, 417, 428/426, 212, 193, 213, 418, 119, 120, 217, 430, 432, 437, 458, 480, 689, 702; 52/789, 788, 790; 181/286, 289; 156/107, 109; 296/96.14

[56] References Cited

U.S. PATENT DOCUMENTS

| | | | |
|---|---|---|---|
| 3,783,084 | 1/1974 | Quenett | 428/34 |
| 3,974,316 | 8/1976 | Jacquemin | 428/34 |
| 4,312,903 | 1/1982 | Molari | 428/34 |
| 4,368,226 | 1/1983 | Mucaria | 428/34 |
| 4,556,600 | 12/1985 | Kraemling | 428/216 |
| 4,614,676 | 9/1986 | Rehfeld | 428/34 |
| 4,848,875 | 7/1989 | Baughman | 428/34 |

FOREIGN PATENT DOCUMENTS

| | | |
|---|---|---|
| 0018955 | 11/1980 | European Pat. Off. . |
| 2161443 | 7/1973 | France . |
| 2293566 | 7/1976 | France . |
| 2445222 | 7/1980 | France . |
| 1367977 | 9/1974 | United Kingdom . |
| 1502771 | 3/1978 | United Kingdom . |
| 1516869 | 7/1978 | United Kingdom . |
| 2013692 | 8/1979 | United Kingdom . |
| 2015427 | 9/1979 | United Kingdom . |
| 2022098 | 12/1979 | United Kingdom . |
| 2041825 | 9/1980 | United Kingdom . |
| 1600867 | 10/1981 | United Kingdom . |

Primary Examiner—Ellis P. Robinson
Assistant Examiner—Donald J. Loney
Attorney, Agent, or Firm—Spencer, Frank & Schneider

[57] ABSTRACT

A glazing panel and hollow glazing panel, the hollow glazing panel including a first pane, a second pane held in spaced-apart, face-to-face relationship with the first pane, and a plurality of localized damping members positioned between the first and second panes, adherent thereto, and distributed therebetween over the area of the opposing faces thereof, wherein the first pane comprises a pair of vitreous sheets and an intervening layer of polymeric material separating the sheets of the pair and to which the sheets adhere, wherein the first pane has a shape, an area, and a total mass of vitreous material, and may be compared to a notional monolithic vitreous sheets having a coincidence frequency ($\phi_m$) and a critical frequency of coincidence, wherein the first pane has a coincidence frequency ($\phi_p$) and at least one critical frequency of coincidence, and wherein the intervening layer has viscoelastic properties such that the lowest critical frequency of coincidence of the first pane is greater than the critical frequency of coincidence of a notional monolithic vitreous sheet having the same shape and area as the first pane and having a mass equal to the total mass of vitreous material in the first pane.

34 Claims, 5 Drawing Sheets

COMPOSITE GLAZING PANEL

BACKGROUND OF THE INVENTION

1. Field of the Invention

This invention relates to a glazing panel which consists of or includes a pane comprising a pair of vitreous sheets adherent to an intervening layer of polymeric material.

The present invention has especial reference to the acoustic properties of such composite glazing panels, and in particular to the acoustic attenuation which may be afforded by such panels.

2. Description of the Related Art

According to the current theories, the acoustic attenuation afforded across a monolithic sheet depends on its mass per unit area, that is, for a given material, on its thickness. Briefly stated, the acoustic attenuation afforded over a particular range of sound frequencies is directly proportional to the thickness of the sheet Matters are complicated, however, by the fact that for any sheet, there will be two sound transmission peaks, one at each end of that range, and the frequencies at which these peaks occur are also determined at least in part by the thickness of the sheet. The lower frequency peak, the resonance peak, occurs at a frequency which depends on the shape and area of the sheet but also it increases in proportion to any increase in thickness of the sheet. The higher frequency peak occurs at the critical frequency of coincidence of the sheet, that is the frequency of free bending waves in the sheet, and that decreases in proportion to any increase in thickness of the sheet. By way of example, a 1 meter square monolithic panel of glass 4 mm thick has a resonance frequency of about 20 Hz and a critical frequency of coincidence ($\phi_m$) of about 3000 Hz. A monolithic 8 mm sheet of glass of the same shape and area has a resonance frequency of about 40 Hz and a critical frequency of coincidence ($\phi_m$) of about 1500 Hz. Theory predicts that doubling the sheet thickness will give an increase in sound attenuation (in fact of about 6 dB) for sound of a given frequency, but that, due to resonance and coincidence effects, this increase in attenuation will be masked, in the example given, at frequencies around 40 Hz and 1500 Hz. In fact, at its coincidence frequency of around 1500 Hz, an 8 mm glass sheet may well afford less attenuation than a 4 mm sheet. A particular problem is that by increasing sheet thickness in this way, a sound transmission peak is transferred into a region of the sound spectrum to which the human ear is more sensitive.

References to acoustic properties of panels throughout this specification are references to such properties measured in accordance with the German Federal Republic Standard VDI 2.719.

The position is more complicated when considering laminated glazing panels because of the different natures of the intervening layers of adhesive material and of the glass. However in a typical safety laminate there must be a rather strong bond between the glass and the adhesive so that in the event of breakage fragments of the glass are retained by the panel and do not fly off and possibly cause injury. In fact the acoustic behaviour of typical laminated safety glazings is scarcely distinguishable from the acoustic behaviour of a single monolithic sheet of glass of the same shape and area as the laminate and of the same thickness as the total thickness of the glass in the laminate. Thus for the purposes of this specification and as regards their acoustic properties, such conventional laminates are considered as equivalent to a single monolithic sheet.

SUMMARY OF THE INVENTION

It is an object of this invention to provide a composite glazing unit which affords, weight for weight, improved acoustic attenuation.

According to the present invention, there is provided a glazing panel which consists of or includes a pane comprising a pair of vitreous sheets adherent to an intervening layer of polymeric material, characterised in that the sheets of said pair are separated by a said intervening layer of polymeric material which layer has viscoelastic properties such that the critical frequency of coincidence (or the lower or lowest critical frequency of coincidence if there is more than one) of the pane ["the coincidence frequency ($\phi_p$) of the pane"] is greater than the critical frequency of coincidence of a notional monolithic vitreous sheet ["the coincidence frequency ($\phi_m$) of the equivalent monolith"] which monolithic sheet is of the same shape and area as the pane and has a mass equal to the total mass of vitreous material in the pane, and in that said panel is associated with means capable of influencing the temperature of said intervening layer of polymeric material.

A panel according to the invention has, by virtue of the nature of tis interlayer, improved acoustic insulating properties as compared with an otherwise similar panel which does not have such an interlayer, and furthermore, this improvement in acoustic properties may be conserved over a wide range of ambient temperatures. A particular problem is encountered with glazing panels which are to be used in an external wall of a structure in certain climates where the external ambient temperature may fall below freezing (that is, 0° C.), notwithstanding that the interior of the structure is to be maintained at comfortable living temperatures (for example 15° C. to 25° C.). Many suitable polymeric materials undergo a considerably change in their viscoelastic properties over the range from comfortable living temperatures to temperatures below freezing. In freezing weather, there will clearly be a temperature gradient through such a glazing panel, and this might well mean that the interlayer would be cooled to such an extent that it hardened sufficiently to afford a direct dynamic coupling between the two sheets of vitreous material. The use of means capable of influencing the temperature of the interlayer enables problems due to such variation in the viscoelastic properties of that interlayer to be alleviated, so that the acoustic properties of the panel can be maintained over a wider range of external ambient temperatures.

A panel according to the invention may be installed in a building, or in a vehicle. One use for which panels according to the invention are especially suitable is as glazings for railway carriages, particularly those of underground railway systems or of high speed transit systems where for one reason or another, ambient noise levels may be rather high.

A further advantage of panels according to the invention lies in their resistance to breakage due to impact of a projectile such as a flying stone. Due to its viscoelastic properties, the intervening layer of polymeric material is highly adapted to absorb and damp out stresses arising because of such an impact, with the result that, weight for weight, the panel may have a better resistance to breakage than a classical safety laminate which has an interlayer of polyvinyl butyral. Furthermore, such resistance to breakage can be conserved over a rather wide temperature range in a panel according to this invention because the viscoelastic properties of the intervening layer of polymeric material can be so conserved. Thus, for a same or better acoustic attenuation and a same or better resistance to breakage, especially at low ambient temperatures, a panel according to the invention can be made thinner, and therefore lighter than such a classical safety laminate. It will be appreciated that weight considerations are of importance in, for example, railway carriages having high glazed areas.

In some preferred embodiments of the invention, said pane is held in spaced face-to-face relation with a second pane to form a hollow glazing unit. Hollow glazing units can have very good acoustic insulation characteristics, and they also afford good thermal insulation. Advantageously, said second pane consists of a single unlaminated sheet of vitreous material. Such a sheet is very much less costly to produce than a laminated pane.

In the case of hollow glazing panels, it is known that one or more further transmission peaks may arise due cavity resonance, the resonance of any gaseous mass held within an inter-pane space of the panel. In order to alleviate such a transmission peak, it is preferred that a plurality of localised damping members adherent to said spaced panes is distributed over their area.

The advantages to be gained by the use of such localised damping members are very considerable, and in its second aspect, the present invention also provides a hollow glazing panel which includes a first pane comprising a pair of vitreous sheets adherent to an intervening layer of polymeric material, characterised in that the sheets of said pair are separated by a said intervening layer of polymeric material which layer has viscoelastic properties such that the critical frequency of coincidence (or the lower or lowest critical frequency of coincidence if there is more than one) of the panel ["the coincidence frequency ($\phi_p$) of the pane"] is greater than the critical frequency of coincidence of a notional monolithic vitreous sheet ["the coincidence frequency ($\phi_m$) of the equivalent monolith"] which monolithic sheet is of the same shape and area as the pane and has a mass equal to the total mass of vitreous material in the pane, in that said first pane is held in spaced face-to-face relationship with a second panel, and in that a plurality of localised damping members is provided adherent to said spaced panes and distributed over their area.

The optical properties of such damping members are not critical in the case of a glazing panel which is opaque, but, especially for use in a transparent or translucent panel, it is preferred that said damping members are formed of light-transmitting plastics material, preferably from a silicone, polyisobutylene, a polyester, polyurethate, polyacrylate, vinyl polymer, epoxy resin, or an acrylic resin. Polyisobutylene can be used to form translucent damping members, while transparent damping members, as preferred for use in transparent panels can be formed from materials within the other categories recited.

Glazing panels according to the second aspect of the invention preferably also make use of the first aspect of the invention with its attendant advantages as aforesaid, and it is accordingly preferred that said panel is associated with means capable of influencing the temperature of said intervening layer of polymeric material.

The means capable of influencing the temperature of said intervening layer of polymeric material may operate actively or in a passive manner to influence the temperature of the polymeric material as will be adverted to below.

Advantageously, the inter-pane space is paced with an aerogel. Suitable aerogels are microporous materials such as those described per se in European Patent Specification No. EP 0 018 955. Such aerogels have pores with diameters of between 1 and 100 nm, for example about 10 nm, and they can be made transparent, and they are very effective thermal insulators, even when used in fairly thin layers. This gives important advantages in enabling a hollow glazing panel to be formed with a reduced inter-pane space, for example 3 to 4 mm as compared with an 8 to 10 mm air-filled space, for the same, or a better, insulating efficiency. Because the panel need not be so thick, its frame can be lighter, and this is of importance if the panel is to be incorporated into a vehicle.

In some preferred embodiments of the invention, said means capable of influencing the temperature of said intervening layer of polymeric material forms part of the panel, since this provides an integral unit which facilitates installation.

Advantageously, said means capable of influencing the temperature of said intervening layer of polymeric material comprises a light-transmitting coating deposited on a face of a substantially rigid steel of the panel. Such a coating is of negligible weight as compared with the weight of the panel, and can be quite efficient in influencing the temperature of said intervening layer of polymeric material. In order to promote such efficiency, it is preferred that a said light-transmitting coating is in contact with a said intervening layer of polymeric material.

Such coatings may also serve other purposes. In some preferred embodiments of the invention, said panel comprises at least two light-transmitting coatings which have different radiation transmitting properties. This permits different combinations of highly advantageous properties to be conferred on the panel.

In some preferred embodiments of the invention, the or at least one said coated sheet is adapted to transmit less than 75%, and preferably less than 65%, of total incident solar energy. Such coatings are very useful for reducing solar glare, and also for reducing unwanted solar heat gain. This can be an important advantage when it is desired that the temperature of the interior of the glazed structure should be maintained at moderate levels. Of course such interior temperature could be maintained at moderate levels by a suitable air-conditioning system, but it should be noted that the cost of cooling the interior of a structure can be rather high. Many such "anti-solar" coatings absorb solar radiation so that their temperature increases, and by suitably locating them, they can provide heat energy for influencing the temperature of the polymeric material.

Alternatively, or in addition, some preferred embodiments of the invention provide that the or at least one said coating is a conductive coating. Conductive coatings have the property of reducing the emissivity of the coated sheet face in respect of long wavelength infrared radiation provided that they are properly located. Low emissivity coatings are ineffective as such unless placed at an interface between their carrier sheet and air or another gas, or a vacuum. They are thus useful for reducing heat loss from a glazed structure. Such a low emissivity coating may be located at the outdoors side of a viscoelastic polymeric interlayer, so that in cold weather, the temperature of that interlayer is closer to the temperature of the interior of the glazed structure than it would otherwise be. Alternatively, if desired, such a low emissivity coating could be located to the indoors side of a viscoelastic interlayer associated with an anti-solar coating in order to reduce transfer of heat energy absorbed by the anti-solar coating into the indoors space.

It will be appreciated that a single coating may be both conductive and capable of screening at least 25% of incident solar radiation so that it could act, depending on its location in the panel, both as a low emissivity coating and an anti-solar coating, and also that a panel may incorporate a first coating which is capable of screening at least 25% of incident solar radiation, whether conductive or not, and a second coating which is conductive, but not necessarily capable of absorbing or reflecting such a high proportion of solar radiation.

In some preferred embodiments of the invention, means is provided for supplying heat energy to the panel. This is a very simple way of actively influencing the temperature of the viscoelastic interlayer. Various kinds of heating means could be used, provided of course that the heating is effective under the conditions to which the panel will be exposed during its use. By way of example, in the case of a hollow unit, the means for influencing the temperature of the interlayer of polymeric material may comprise means for circulating warm air through the interspace of the unit. This may easily be done by diverting warm air from means for thermally conditioning the interior of the structure in whose wall the panel is located. Such is not however recommended, as it is preferred that any interspace of a hollow glazing unit should be sealed in order to prevent condensation appearing within the hollow glazing unit to mar visibility through it. In some preferred embodiments of the invention, means is provided for passing a heating current through a said conductive coating when present. This is an effective way of supplying heat energy over the coated face area of the panel. Alternatively, or in addition, some preferred embodiments of the invention provide means for blowing hot air across a face of the panel.

The nature of the polymeric material for forming the interlayer is of considerable importance for the performance of the invention. There is a number of materials which have the required properties and could in fact be used. Among such materials may be cited materials which are conventionally used for forming laminated glazing panels but which are modified by the addition of rather large quantities of plasticizer. Examples of compositions for forming such layers are: 2 parts by weight of polyvinyl butyral with 1 part by weight of a plasticizer such as FLEXOL TM from Union Carbide, and a copolymer of 99 parts by weight polyvinyl chloride and 1 part by weight of glycidyl methacrylate with 40 parts by weight of a plasticizer such as dioctylsebacate. However because of their very high content of plasticizer, handling problems arise and films of such materials are very difficult to incorporate into glazing panels on a commercial scale. For the best results, we have found that it is preferable to form the intervening polymeric layer from a polyester, vinyl polymer, epoxy resin, or, and most preferably, an acrylic resin. Such materials afford a number of polymers having exceptional acoustic properties. For a given desired level of acoustic insulation, the use of such a polymer can allow a significant reduction in the thickness and thus in the weight of vitreous material which has to be incorporated in the panel. This is of particular importance when the panel is to be incorporated into a window of a vehicle, for example a passenger coach of a train, especially if the coach has a high glazed area. A further important advantage of the use of such polymers is that they can incorporate catalysts and/or actuators so that they may easily be polymerised in situ. The polymer can be incorporated between the two vitreous sheets in fluid state and then polymerised. This greatly facilitates manufacture of the panel as compared with the use of a preformed film of highly plasticized polymer. In the most preferred embodiments of the invention, such polymer is an acrylic resin which is polymerisable by ultra-violet radiation.

Advantageously, the material of which said intervening layer is formed has a Shore A hardness measured at 20° C. of not more than 50, and preferably not more than 30. We have found that the adoption of this feature tends to promote a very efficient acoustic attenuation. By way of comparison it may be noted that an acrylic resin recently proposed for use in safety laminates has a Shore A hardness of between 70 and 80.

A composite pane of a panel according to the invention may be formed from two or more vitreous sheets which are of equal thickness, or there may be an inequality of thickness between the sheets, and the panel may be symmetrical or asymmetrical.

If all the vitreous sheets of the pane are of equal thickness, then the pane will in general tend to exhibit a single coincidence frequency $\phi_p$, provided that all the interlayers (if there are more than one) are of the same thickness and polymeric material. That frequency $\phi_p$ will be further from, or closer to, the common critical frequency $\phi_s$ of the various individual vitreous sheets of the pane, depending on the viscoelastic properties of the polymeric interlayer(s) incorporated in the panel.

If, on the other hand, the vitreous sheets exhibit different thicknesses, then there will in general be more than one critical frequency: the critical frequency which is of most practical importance is the lower or lowest critical frequency of the pane which we also call $\phi_p$, and that will be further from, or closer to, the critical frequency (also referred to as $\phi_s$) of the most massive individual vitreous sheet of the pane, depending on the viscoelastic properties of the polymeric interlayer(s) incorporated in the panel.

If two vitreous sheets were separated by an intervening layer which behaved as an "ideal damper", then there would be no dynamic coupling between them and $\phi_p$ would be equal to $\phi_s$. If on the other hand, the two vitreous sheets were to be coupled together perfectly rigidly, as is effectively the case with conventional safety laminates, then $\phi_p$ would be equal to $\phi_m$, the coincidence frequency of the equivalent monolith. In practice therefore, $\phi_p$ will lie between $\phi_s$ and $\phi_m$, and a measure of the acoustic effectiveness due to an interlayer of a panel according to the invention is given by the ratios between those various critical frequencies. It is preferred that the pane includes a vitreous sheet whose individual critical frequency of coincidence is at least as low as that of the or any other vitreous sheet of the pane ["the lowest coincidence frequency ($\phi_s$) of any sheet of the pane"] and the ratio between that lowest coincidence frequency ($\phi_s$) of any sheet of the pane and the coincidence frequency ($\phi_p$) of the pane is less than the ratio between the coincidence frequency ($\phi_p$) of the pane and the coincidence frequency ($\phi_m$) of the equivalent monolith.

In order that the (lower or lowest) coincidence transmission peak at as high a frequency as possible, it is preferred that the coincidence frequency ($\phi_p$) of the pane is at least 1.2 times and preferably at least 1.5 times the coincidence frequency ($\phi_m$) of the equivalent monolith.

If all the vitreous sheets of the pane are of the same thickness, the pane may exhibit a single coincidence transmission peak for sound at a frequency more or less close to the common coincidence frequency $\phi_s$ of those sheets. In order to avoid such a pronounced transmission peak, it is preferred that said pane comprises vitreous sheets of at least two different thicknesses. For example one vitreous sheet might be at least 1.15 times as thick as the or an other sheet of the pane. In this way the coincidence transmission peaks attributable to such sheets of different thickness will not occur at the same frequency, and sound transmission at the peak attributable to one sheet may be effectively attenuated by the other sheet. In order to promote such attenuation, it is advantageous that said pane comprises at least one vitreous sheet which is at least 1.5 times as thick, and preferably at least twice as thick, as at least one other vitreous sheet of the pane.

Advantageously, the panel includes at least one vitreous sheet which is of chemically tempered glass and is not more than 2 mm thick. Being tempered, such a sheet will have good resistance to breakage, and it will also have a rather high critical frequency of coincidence (above 6000 Hz) and is useful for masking lower frequency coincidence transmission peaks of other parts of the panel when it is not dynamically coupled to another sheet. Also, such a sheet may serve as a useful support for a coating.

Preferably, the panel includes at an external face thereof a vitreous sheet for which no other sheet of the panel is thicker. The provision of such a relatively thick sheet of the panel on an external face is thought valuable for affording good resistance to breakage. Such a sheet may if desired be tempered, whether thermally or chemically as appropriate to its absolute thickness, and if fitted as a window of a vehicle, it should be located at the outdoors side of the panel.

Preferably, said panel affords an acoustic attenuation $R_w$ of at least 37 dB. Such an acoustic attenuation gives considerable benefits in the comfort of various locations, and is especially useful in environments where external noise levels are rather high, such as for example in railway carriages.

Panels according to the invention are especially suitable for fitting as a window of a vehicle, for example a railway carriage.

BRIEF DESCRIPTION OF THE DRAWINGS

Preferred embodiments of the invention will now be described with reference to the accompanying diagrammatic drawings in which.

DESCRIPTION OF THE PREFERRED EMBODIMENTS

Figure 1:
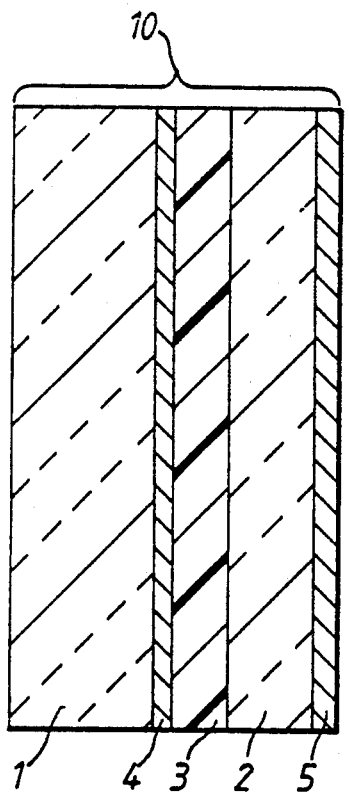
FIGS. 1 to 4 are cross sections through three embodiments of the invention.
Figure 2:
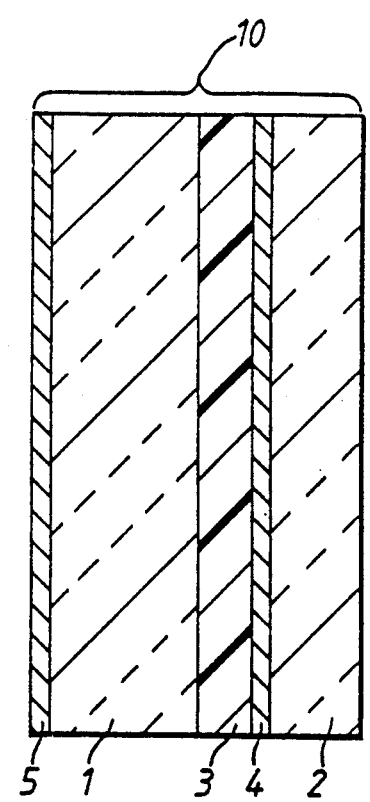
Figure 3:
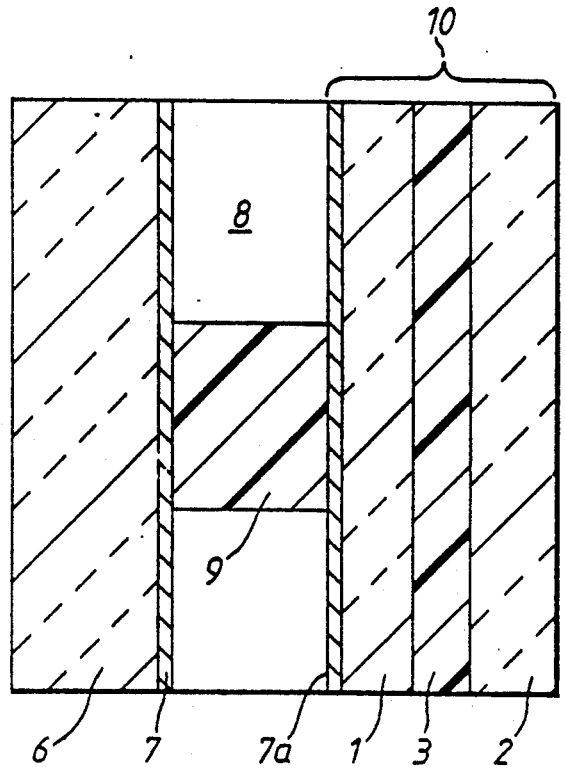

In FIGS. 1 to 3, there is shown a laminated pane 10 composed of two vitreous sheets 1 and 2 which are separated by an adherent intervening layer 3 of polymeric material which layer has viscoelastic properties such that the critical frequency of coincidence (or the lower or lowest critical frequency of coincidence if there is more than one) of the pane 10 ["the coincidence frequency ($\phi_p$) of the pane"] is greater than the critical frequency of coincidence of a notional monolithic vitreous sheet ["the coincidence frequency ($\phi_m$) of the equivalent monolith"] which monolithic sheet is of the same shape and area as the pane 10 and has a mass equal to the total mass of vitreous material in the sheets 1 and 2 which go to make up the pane 10.

In FIG. 1, the first vitreous sheet 1 bears a coating 4 which is such that the coated sheet is adapted to transmit less than 65% of total incident solar energy. The anti-solar coating 4 is located within the thickness of the panel to protect it from scratching and weathering. The second vitreous sheet 2 also bears a coating, this coating being designated by reference numeral 5 and being formed of tin oxide which is doped so that it is electrically conductive and thus reduces the emissivity of the coated face in respect of long wavelength infra-red radiation. Tin oxide coatings can be highly resistant to abrasion and weathering, and can thus be located on an external face of the panel. The first vitreous sheet 1 is thicker than the second sheet 2 and the panel is intended for mounting in a wall of a structure with that thicker sheet 1 on the outdoors side.

In FIG. 2, the construction is similar to FIG. 1, but the coatings are relocated. There is an anti-solar coating 4 borne this time by the second vitreous sheet 2, but again located within the thickness of the panel to protect it from scratching and weathering. A doped tin oxide low emissivity coating 5 is deposited on the external face of the first vitreous sheet 1 which is again thicker than the second sheet 2 and the panel is intended for mounting in a wall of a structure with that thicker sheet 1 on the outdoors side.

In FIG. 3, the laminated pane 10 is held in spaced relation to a second pane constituted by a third vitreous sheet 6 which bears a coating 7 on the face directed towards the space 8 between those panes. Extending across the interpane space 8 and adherent to each of the panes 6, 10 is distributed a plurality of localised damping members such as 9. The coating 7 may be an anti-solar coating or a low emissivity coating, or it may have a combination of those properties. An outer face of the pane 10, for example that face wich is directed towards the interpane space is shown provided with an optional, but preferred coating 7a which has different radiation transmitting properties from those exhibited by the coating 7. The panel of FIG. 3 is thus in accordance with both aspects of this invention. If the localised damping members such as 9 were to be omitted, that panel would be in accordance with the first aspect of this invention only, whereas if the coating 7 were to be omitted, the panel would be in accordance with the second aspect of this invention only. Optionally, the interpane space 8 is packed with an aerogel. This enables a better thermal insulation effect to be obtained, and with a much reduced interpane space. Alternatively, acoustic attenuation and/or thermal insulation may be promoted by filling the interpane space with a gas or gas mixture of greater density than air such as one or more of argon, $SF_6$ and a freon. $SF_6$ promotes thermal insulation if the inter-pane space is not too great, and also promotes acoustic attenuation. Argon promotes thermal insulation, and freons promote acoustic attenuation.

Figure 4:
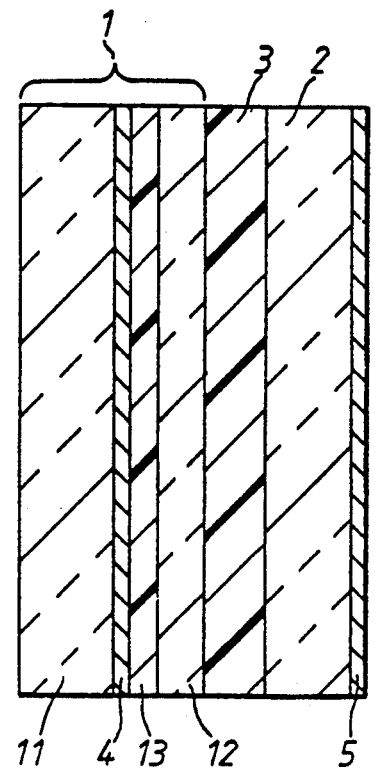

In FIG. 4, the first vitreous sheet 1 of the pane is replaced by a safety laminate of classical type which may be considered as equivalent to a monolithic sheet form the point of view of acoustic attenuation. This laminate comprises glass sheets 11, 12 which are bonded together by an intervening layer 13 for example of polyvinyl butyral. An anti-solar coating 4 is deposited on that face of the vitreous sheet 11 which will be incorporated internally of the panel, and an optional but preferred low emissivity coating 5 is deposited on that face of the sheet 2 which is to be external of the panel.

Each of the panels illustrated in FIGS. 1 to 4 is intended to be mounted in a wall of an enclosure with its right-hand side as shown directed towards the interior of that enclosure.

TEST PANEL (COMPARATIVE) (cf FIG. 3)

Figure 5:
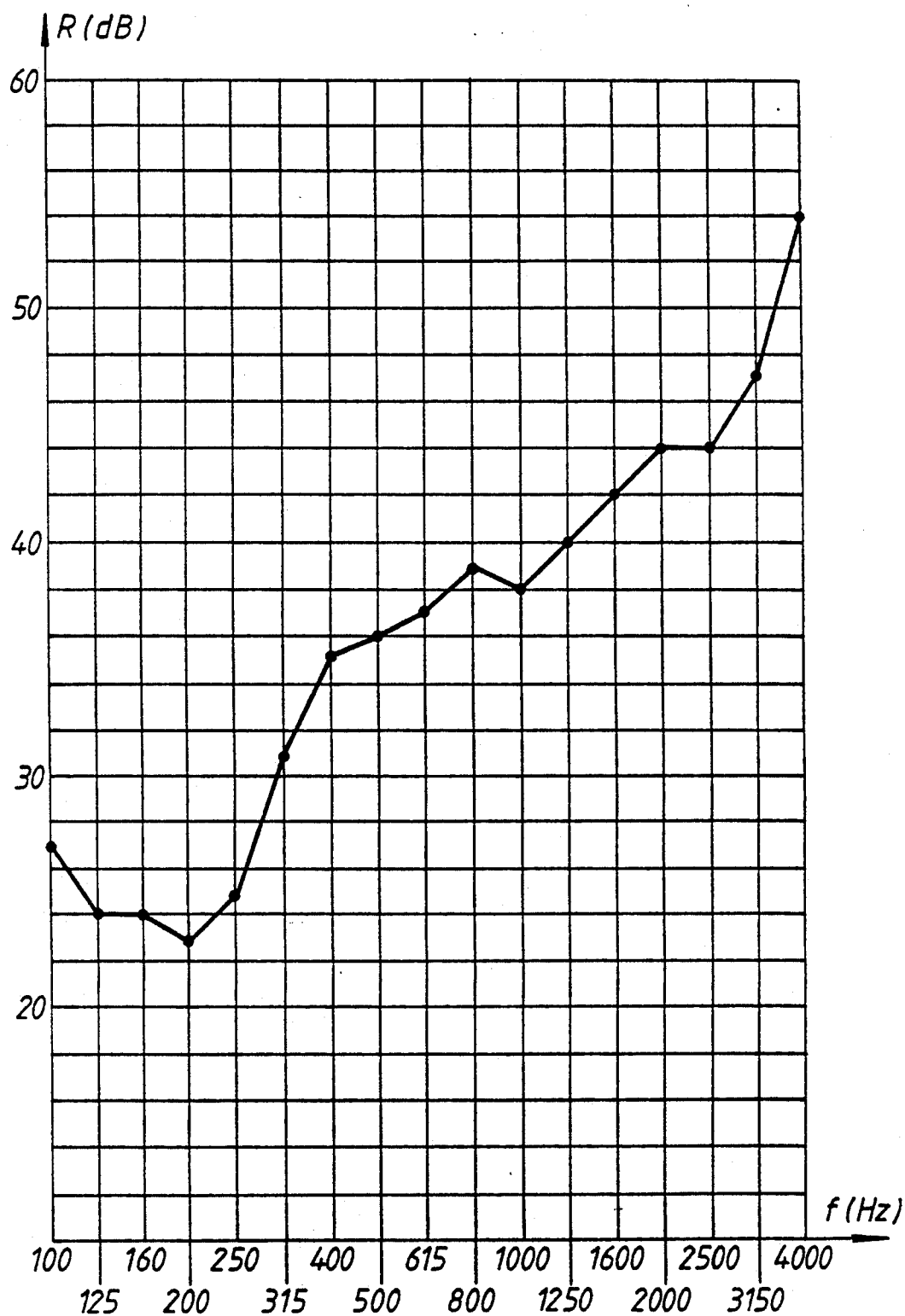
FIG. 5 is a graph of the acoustic attenuation afforded by a comparative test panel.

A test panel consists of a 5 mm glass sheet (cf 6) held spaced 12 mm (cf 8) away from a first, 5 mm glass sheet (cf 1) laminated to a second, 6 mm glass sheet (cf 2) by an intervening layer (cf 3) of polyvinyl butyral 0.76 mm in thickness. Damping members such as 9 were omitted. The total weight of the panel was 40 kg/m². The acoustic attenuation afforded by that panel is shown in the graph which forms FIG. 5. The value of $R_w$ for the acoustic attenuation afforded was 38 dB.

The critical frequency of coincidence ($\phi_m$) of a single monolithic sheet 11 mm thick is approximately 1150 Hz. The lowest critical frequency of coincidence ($\phi_s$) of any sheet of the panel, in fact that of the 6 mm sheet, is approximately 2150 Hz, the critical frequency of coincidence of a 5 mm sheet being approximately 2550 Hz. In fact, the safety laminate part of the panel formed by the 5 and 6 mm sheets and the intervening adhesive layer acted acoustically in substantially the same manner as a singly monolithic glass sheet having a thickness of 11 mm. As shown in the graph, the lowest coincidence frequency ($\phi_p$) of the panel lies at about 1000 Hz due to the laminate, with a secondary coincidence transmission peak at between 2000 Hz and 2500 Hz due to the spaced single sheet of 5 mm glass. There is also apparent a transmission peak at around 200 Hz due to cavity resonance effects.

Heat transfer through the panel under still air conditions is about 3 $W.m^{-2}.K^{-1}$.

EXAMPLE 1 (FIG. 1)

The first glass sheet 1 was 6 mm thick, and the second 2 was 2.8 mm thick. The two glass sheets were separated by an intervening layer 1.8 mm thick of acrylic resin 3 having a Shore A hardness at 20° C. of between 15 and 20. The resin used was UVEKOL A TM from UCB S.A., Speciality Chemicals Division, Anderlechtstraat 33, B-1620 Drogenbos, Belgium. The first glass sheet bore an anti-solar coating 4 comprising 62% CoO, 26% $Fe_2O_3$ and 12% $Cr_2O_3$ having a thickness of between 65 and 80 nm. The first glass sheet and that coating together had a total solar energy transmission factor of 58%. That anti-solar coating was non-conductive. The energy absorption factor of the coated sheet was about 34%.

Due to its absorption of radiant energy, the anti-solar coating 4 becomes heated, and some of the heat energy is transferred by conduction to the acrylic layer 3, thus influencing its temperature in a manner favourable for conserving its viscoelastic properties, and thus the acoustic attenuation afforded by the panel at low ambient temperatures.

Figure 6:
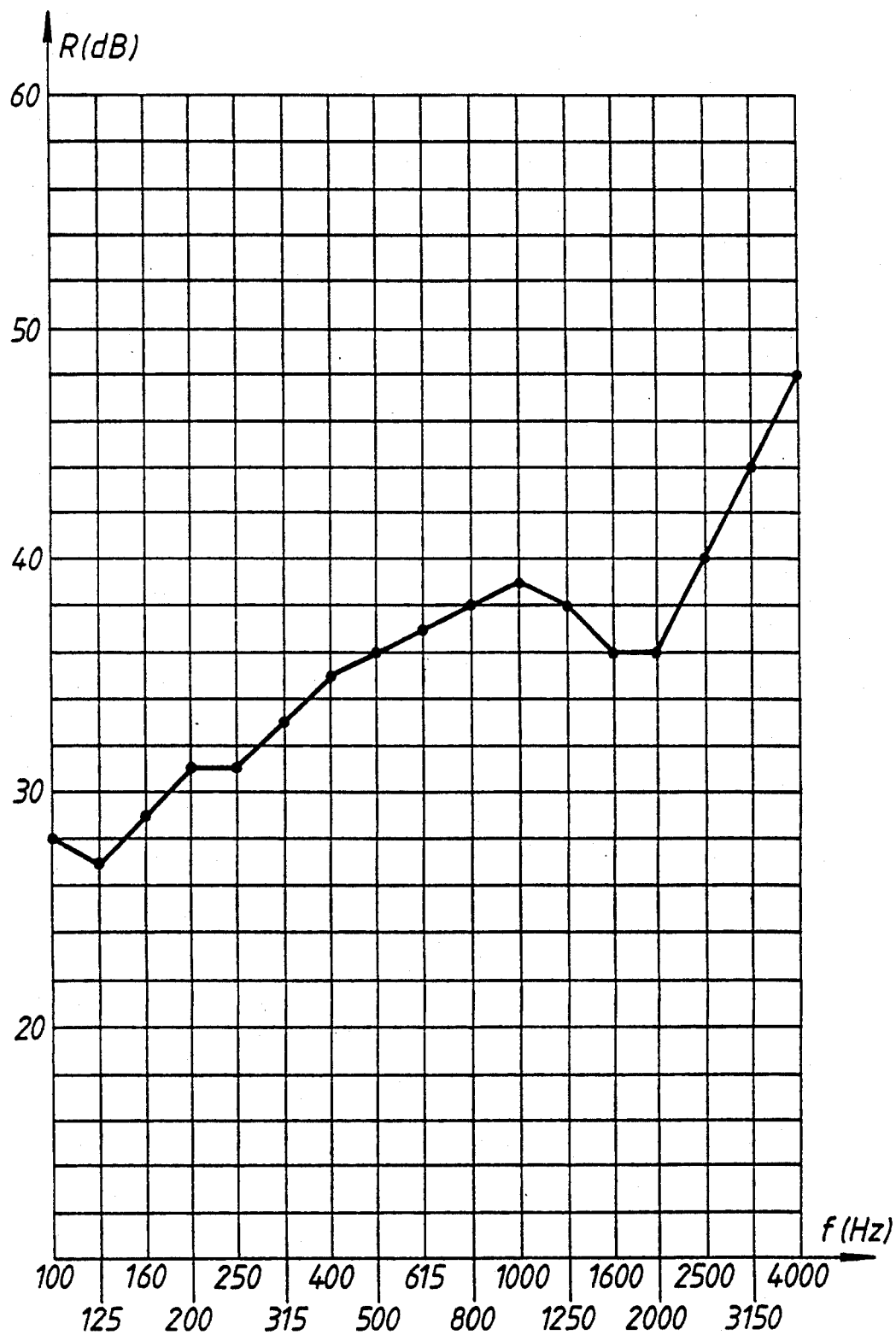
FIGS. 6 to 8 are graphs of the acoustic attenuation afforded by panels according to the invention.

The second glass sheet bore a 760 nm thick low emissivity coating of tin oxide doped with fluorine ions to render it conductive with a resistivity of 12 ohms per square. The emissivity of the coating in respect of wavelengths greater than 5000 nm was about 0.1. The total weight of the panel was 22.5 kg/m². The acoustic attenuation afforded by that panel is shown in the graph which forms FIG. 6. The value of $R_w$ for the acoustic attenuation afforded was 37 dB.

It will be noted that this panel gives very nearly as good acoustic attenuation measured as $R_w$ as does the Test Panel, with a weight saving of over 40%.

The critical frequency of coincidence ($\phi_m$) of a single monolithic sheet 8.8 mm thick is approximately 1459 Hz. The lower critical frequency of coincidence ($\phi_s$) of either sheet of the pane, in fact that of the 6 mm sheet, is approximately 2150 Hz. As shown in the graph, the coincidence frequency ($\phi_p$) of the pane 10 lies between 2000 Hz and 2500 Hz.

Heat transfer through the panel under still air conditions is about 3.7 $W.m^{-2}.K^{-1}$.

In a variant of this Example, the first coated vitreous sheet 1 is replaced by a sheet 5 mm thick, and the second coated vitreous sheet 2 is replaced by a sheet 4 mm thick, and in a second variant of this Example, the first coated vitreous sheet 1 is replaced by a sheet 6 mm thick, the second coated vitreous sheet 2 is replaced by a sheet 5 mm thick, and the intervening layer 3 of UVEKOL A TM is 1.5 mm thick. These panels also give very good acoustic attenuation.

In third variants of this Example, any or all of the first and second sheets mentioned are made of thermally tempered glass. This promotes resistance to breakage. Furthermore, in the event that breakage does occur, the fragments of a thermally tempered glass sheet tend to be smaller than the largest fragments of a broken untempered sheet, and are therefore easily retained by the intervening layer so reducing the risk of injury due to flying fragments of glass. Nevertheless, a broken laminate cam be removed sufficiently easily from its frame, for example by kicking, so as to allow emergency exit from, for example, an overturned vehicle.

In fourth variants of this Example, the intervening layer 3 of polymeric material is coloured in the mass, for example a dye may be added, to modify the visual appearance of the panel.

In fifth variants of this Example, the second glass sheet 2 is provided at its opposite side margins with electrically conductive bus strips in contact with the low emissivity layer 5. Terminals are soldered to the bus strips, and a heating current is passed through the low emissivity layer via those terminals, again to influence the temperature of the acrylic layer 3 in a manner favourable for conserving its viscoelastic, and thus acoustic, properties, especially at low ambient temperatures.

EXAMPLE 2 (FIG. 2)

Example 1 was repeated with the modification that the two coatings 4 and 5 were rearranged as shown in FIG. 2. The acoustic properties of the panel were unaffected. The presence of the low emissivity layer 5 at the outdoors side of the panel reduces infra-red radiation from the panel so that at low ambient temperatures, the panel, and thus the acrylic layer 3, is warmer than it would otherwise be. This warming of the acrylic layer 3 is promoted by the presence of the adjacent energy-absorbing anti-solar layer 4. This influences the temperature of the acrylic layer 3 in a manner favourable for conserving its viscoelastic, and thus acoustic, properties, especially at low ambient temperatures.

In a variant of this Example, the frame in which the panel is mounted is provided with slots, and a heating system of the enclosure in which the panel is mounted is arranged to blow heated air through those slots across the indoors face of the panel to provide supplementary heat energy thereto.

EXAMPLE 3 (cf FIG. 4)

The first glass sheet 1 was replaced by a safety laminate comprising a glass sheet 11, 2.8 mm thick laminated to a sheet 12, 1.7 mm thick by an interlayer 13 of polyvinyl butyral 0.76 mm thick, and the second sheet 2 was 5 mm thick. The sheets 11 and 12 were chemically tempered. The glass sheets 12 and 2 were separated by an intervening layer 1.8 mm thick of acrylic resin sold as UVEKOL A TM having a Shore A hardness at 20° C. of between 15 and 20. The second glass sheet 2 bore, on its face adjacent the acrylic interlayer, an anti-solar coating comprising 62% CoO, 26% $Fe_2O_3$ and 12% $Cr_2O_3$ as described in Example 1. That glass sheet and that coating together had a total solar energy transmission factor of about 60%, and an energy absorption factor of about 33%. Due to its absorption of radiant energy, the anti-solar coating becomes heated, and some of the heat energy is transferred by conduction to the acrylic layer 3, thus influencing its temperature in a manner favourable for conserving its viscoelastic, and thus acoustic, properties.

Figure 7:
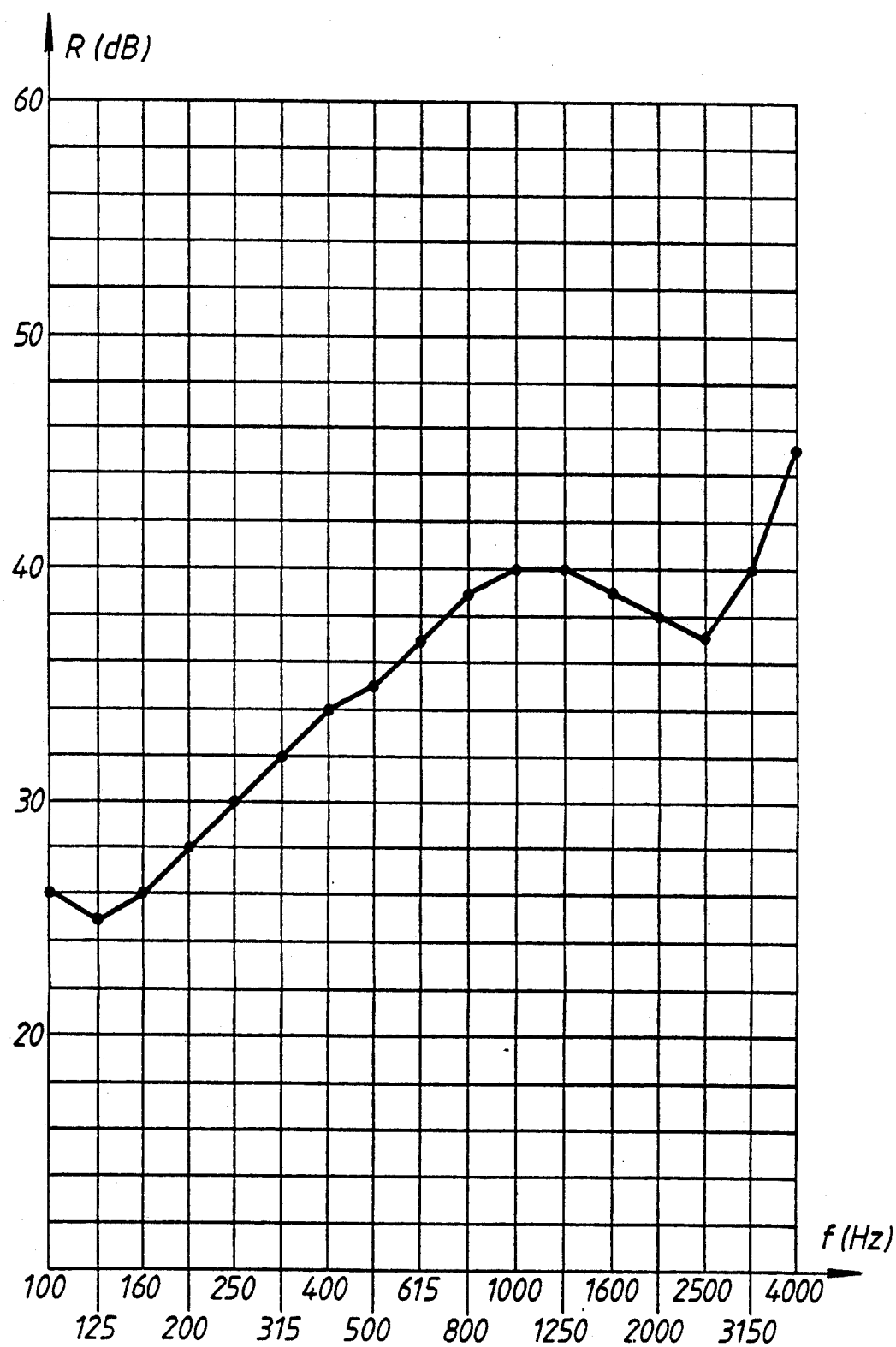

The second glass sheet 2 also bore, on its exposed face, a 760 nm thick low emissivity coating of tin oxide doped with fluorine ions to render it conductive with a resistivity of 12 ohms per square. The emissivity of the coating in respect of wavelengths greater than 5000 nm was about 0.1. The total weight of the panel was 25 kg/$m^2$. The acoustic attenuation afforded by that panel is shown in the graph which forms FIG. 7. The value of $R_w$ for the acoustic attenuation afforded was 38 dB, the same as that of the Test Panel, but with a weight saving of 37%.

The coincidence frequency ($\phi_m$) of the equivalent monolith 9.5 mm thick is approximately 1350 Hz. The lowest critical frequency of coincidence ($\phi_s$) of any sheet of the pane, in fact that of the 5 mm sheet, is approximately 2550 Hz. As shown in the graph, the coincidence frequency ($\phi_p$) of the pane is about 2500 Hz. We may note here that the safety laminate part of the pane formed by the sheets 11 and 12 and the intervening adhesive layer acted acoustically in substantially the same manner as a single monolithic glass sheet having a thickness of 4.5 mm, and its coincidence frequency was about 2850 Hz.

Heat transfer through the panel under still air conditions is about 3.7 W.$m^{-2}.K^{-1}$.

EXAMPLE 4 (FIG. 4)

Figure 8:
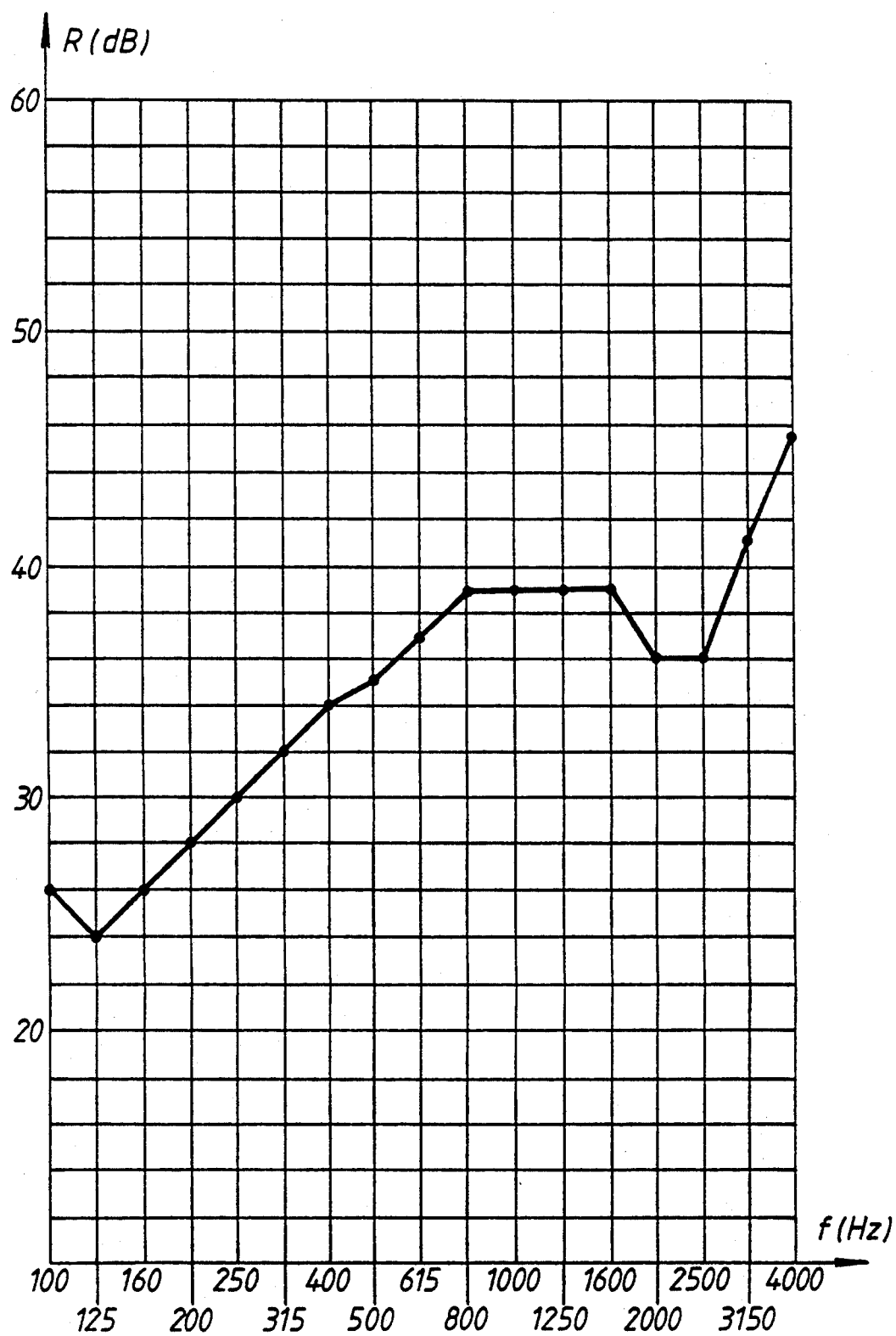

The first glass sheet 1 was replaced by a safety laminate comprising a glass sheet 11, 6 mm thick laminated to a sheet 12, 1.7 mm thick by an interlayer 13 of polyvinyl butyral 0.76 mm thick, and the second sheet 2 as 3 mm thick. The sheets 12 and 2 were chemically tempered. The glass sheets 12 and 2 were separated by an intervening layer 1.8 mm thick of acrylic resin, again using UVEKOL A TM, having a Shore A hardness at 20° C. of between 15 and 20. The glass sheet 11 bore, on its face adjacent the polyvinyl butyral interlayer, an anti-solar coating 4 comprising 62% CoO, 26% $Fe_2O_3$ and 12% $Cr_2O_3$ having a thickness of between 65 and 80 nm, as described in Example 1. That glass sheet and that coating together had a total solar energy transmission factor of about 58%. The total weight of the panel was about 27 kg/$m^2$. The acoustic attenuation afforded by that panel is shown in the graph which forms FIG. 8. The value of $R_w$ for the acoustic attenuation afforded was 38 dB, the same as that of the Test Panel, but with a weight saving of about one third.

The coincidence frequency ($\phi_m$) of the equivalent monolith 10.7 mm thick is approximately 1200 Hz. The lowest critical frequency of coincidence ($\phi_s$) of any sheet of the pane, in fact corresponds to that of the laminate formed by the 6 mm sheet and the 1.7 mm sheet, and it is approximately 1650 Hz. As shown in the graph, the coincidence frequency ($\phi_p$) of the pane is between 1600 Hz and 2000 Hz.

EXAMPLE 5 (FIG. 3)

A hollow panel was constructed in accordance with FIG. 3. In the pane 10, the first glass sheet 1 was 1.7 mm thick, and the second 2 was 2.8 mm thick. The two glass sheets were chemically tempered and were separated by an intervening layer 1.8 mm thick of acrylic resin, again using UVEKOL A TM, having a Shore A hardness at 20° C. of between 15 and 20. The laminated pane 10 was held in spaced relation to a second pane constituted by a third glass sheet 6 which was 8 mm in thickness and bore a coating 7. Extending across the interpane space 8 and adherent to each of the panes 6, 10 is distributed a plurality of localised damping members such as 9 formed from the same acrylic resin as was used to bond the laminated pane 10. The interpane space was 10 mm wide. The damping members had a diameter of 20 mm and were spaced apart by 20 cm. The total weight of the panel as about 31 kg/$m^2$.

This panel also gives excellent results from the point of view of acoustic attenuation.

In a first variant, the coating 7 was a non-conductive anti-solar coating comprising 62% CoO, 26% $Fe_2O_3$ and 12% $Cr_2O_3$ having a thickness of between 65 and 80 nm. The heat transfer coefficient through the panel under still air conditions is about 2.9 W.$m^{-2}.K^{-1}$ with an air-filled interspace.

In a second variant, the coating 7 was a 760 nm thick low emissivity coating of tin oxide doped with fluorine ions to render it conductive with a resistivity of 12 ohms per square. The emissivity of the coating for wavelengths greater than 5000 nm was about 0.1.

In a third variant, the coating 7 was a conductive anti-solar and low emissivity coating comprising a subbing layer of $SnO_2$ about 30 nm in thickness, overcoated by a vacuum-deposited layer of silver about 25 nm thick which was in turn covered by a layer of $SnO_2$ about 60 nm in thickness. The luminous transmission factor of that coating and the coated sheet was about 47%, the total incident solar energy transmission about 34%, and the emissivity of the coated face in respect of infra-red radiation having wavelengths greater than 5000 nm was about 0.02. The heat transfer coefficient through the panel under still air conditions is about 1.8 W.m$^{-2}$.K$^{-1}$ with an air-filled interspace.

In modifications of this Example, the interpane space 8 is filled with one of: a freon, argon, SF$_6$, a mixture of argon and SF$_6$ or aerogel, instead of air, or it is evacuated.

In modifications of any of the foregoing Examples, one or more of the coatings is placed otherwise than illustrated or described, with the following considerations being borne in mind. Low emissivity coatings are ineffective as such unless placed at an interface between their carrier sheet and air or another gas, or a vacuum. Of course, a conductive anti-solar coating such as described above will retain its solar screening properties when located with the thickness of a laminate. Many anti-solar coating materials are rather fragile and require protection by being placed within the thickness of the panel. It is more convenient in practice to coat a sheet of glass on only one of its faces. In further variants, the glazing panels are curved as opposed to being flat.

What is claimed is:

1. A glazing panel, comprising
   a pane comprised of a pair of vitreous sheets and an intervening layer of polymeric material separating the sheets of the pair and to which the sheets adhere,
   wherein the pane has a shape, an area, and a total mass of vitreous material,
   wherein the pane has a coincidence frequency ($\phi_p$) and at least one critical frequency of coincidence,
   wherein the intervening layer has viscoelastic properties such that the lowest critical frequency of coincidence of the pane is greater than that of a notional monolithic vitreous sheet having the same shape and area as the pane and having a mass equal to the total mass of vitreous material in the pane, and
   wherein the glazing panel is associated with means capable of influencing the temperature of the intervening layer of polymeric material.

2. The glazing panel according to claim 1, wherein the pane is held in a spaced-apart, face-to-face relation with a second pane to form a hollow glazing unit having opposing faces which define an inter-pane space.

3. The glazing panel according to claim 2, further comprising a plurality of localized damping members positioned between the spaced-apart panes, adherent thereto and distributed therebetween over the area of the opposing faces thereof.

4. A hollow glazing panel, comprising a first pane, a second pane held in spaced-apart, face-to-face relationship with the first pane, and a plurality of localized damping members positioned between the first and second panes, adherent thereto, and distributed therebetween over the area of the opposing faces thereof,
   wherein the first pane comprises a pair of vitreous sheets and an intervening layer of polymeric material separating the sheets of the pair and to which the sheets adhere,
   wherein the first pane has a shape, an area, and a total mass of vitreous material,
   wherein the first pane has a coincidence frequency ($\phi_p$) and at least one critical frequency of coincidence, and
   wherein the intervening layer has viscoelastic properties such that the lowest critical frequency of coincidence of the first pane is greater than that of a notional monolithic vitreous sheet which having the same shape and area as the first pane and having a mass equal to the total mass of vitreous material in the first pane.

5. The glazing panel according to claim 3, wherein the plurality of damping members are comprised of a plastics material which is light-transmitting.

6. The hollow glazing panel according to claim 4, wherein the hollow glazing panel is associated with means capable of influencing the temperature of the intervening layer of polymeric material.

7. The glazing panel according to claim 2, wherein the inter-pane space is packed with an aerogel.

8. The glazing panel according to claim 1, wherein the means capable of influencing the temperature of the intervening layer of polymeric material forms part of the glazing panel.

9. The glazing panel according to claim 8, wherein the means capable of influencing the temperature of the intervening layer of polymeric material comprises a light-transmitting coating deposited on a face of one sheet of the pair of vitreous sheets of the glazing panel, which one sheet is substantially rigid.

10. The glazing panel according to claim 9, wherein the light-transmitting coating is in contact with the intervening layer of polymeric material.

11. The glazing panel according to claim 8, wherein the means capable of influencing the temperature of the intervening layer of polymeric material comprises at least two light-transmitting coatings which have different radiation transmitting properties.

12. The glazing panel according to claim 9, wherein the light-transmitting coating is adapted to transmit less than 75% of total incident solar energy.

13. The glazing panel according to claim 9, wherein the light transmitting coating is electrically conductive.

14. The glazing panel according to claim 1, wherein means is provided for supplying heat energy to the glazing panel.

15. The glazing panel according to claim 13, wherein means is provided for passing a heating current through the electrically conductive light-transmitting coating.

16. The glazing panel according to claim 14, wherein heat energy is supplied by providing means for blowing hot air across a face of the glazing panel.

17. The glazing panel according to claim 1, wherein the intervening layer is comprised of a polymer selected from the group consisting of a polyester, a vinyl polymer, an epoxy resin, and an acrylic resin.

18. The glazing panel according to claim 17, wherein the intervening layer is comprised of an acrylic resin and the acrylic resin is polymerizable by application of ultra-violet radiation.

19. The glazing panel according to claim 1, wherein the intervening layer is comprised of a material having a Shore A hardness measured at 20° C. of not more than 50.

20. The glazing panel according to claim 1, wherein the pane includes a vitreous sheet whose individual critical frequency of coincidence is at least as low as that of any other vitreous sheet of the pane, and wherein a ratio between the lowest coincidence frequency ($\phi_s$) of any sheet of the pane and the coincidence frequency ($\phi_p$) of the pane is less than a ratio between the coincidence frequency ($\phi_p$) of the pane and the coincidence frequency ($\phi_m$) of the equivalent monolith.

21. The glazing panel according to claim 1, wherein the coincidence frequency ($\phi_p$) of the pane is at least 1.2

22. The glazing panel according to claim 1, wherein the pane comprises vitreous sheets having at least two different thicknesses.

23. The glazing panel according to claim 22, wherein the pane comprises at least one vitreous sheet which has a thickness which is at least 1.5 times as thick as at least one other vitreous sheet of the pane.

24. The glazing panel according to claim 1, wherein the glazing panel includes at least one vitreous sheet which is a chemically tempered glass and has a thickness which does not exceed 2 mm.

25. The glazing panel according to claim 1, wherein the glazing panel has an external face defined by a thick vitreous sheet having a thickness which is greater than any other sheet of the glazing panel.

26. The glazing panel according to claim 1, which is configured as a window of a vehicle.

27. The glazing panel according to claim 25, which is configured as a window of a vehicle, wherein the thick vitreous sheet of the glazing panel is positioned at the side of the window facing outdoors.

28. The glazing panel according to claim 1, wherein the glazing panel has an acoustical attenuation $R_w$ of at least 37 dB.

29. The glazing panel according to claim 5, wherein the plastic material of the plurality of damping members is selected from the group consisting of a silicone polymer, a polyisobutylene, a polyester, a vinyl polymer, an epoxy resin, and an acrylic resin.

30. The glazing panel according to claim 12, wherein the light-transmitting coating is adapted to transmit less than 65% of total incident solar energy.

31. The glazing panel according to claim 1, wherein one of the pair of vitreous sheets is a safety laminate.

32. The glazing panel according to claim 19, wherein the intervening layer is comprised of a material having a Shore A hardness measured at 20° C. of not more than 30.

33. The glazing panel according to claim 21, wherein the coincidence frequency ($\phi_p$) of the pane is at least 1.5 times the coincidence frequency ($\phi_m$) of the equivalent monolith.

34. The glazing panel according to claim 23, wherein the pane comprises at least one vitreous sheet which has a thickness which is at least twice as thick as at least one other vitreous sheet of the pane.

* * * * *